United States Patent [19]

Golenski

[11] Patent Number: 5,147,206

[45] Date of Patent: Sep. 15, 1992

[54] COMPUTERIZED SYSTEM FOR TRAINING ENGINE MAINTENANCE PERSONNEL

[76] Inventor: Stephen S. Golenski, R.R. 2, Box 11B, New Milford, Pa. 18834

[21] Appl. No.: 636,654

[22] Filed: Dec. 31, 1990

[51] Int. Cl.$^5$ .................................... G09B 19/00
[52] U.S. Cl. .................... 434/219; 434/224; 434/366; 434/389; 434/373
[58] Field of Search .............. 434/314, 219, 366, 389, 434/373

[56] References Cited

U.S. PATENT DOCUMENTS

| | | | |
|---|---|---|---|
| 3,604,128 | 9/1971 | Homann | 434/366 |
| 3,864,849 | 2/1975 | Valentine | 434/314 |
| 3,986,276 | 10/1976 | Valentine | 434/314 |
| 3,986,277 | 10/1976 | Valentine | 434/314 |
| 3,986,278 | 10/1976 | Valentine | 434/314 |
| 3,987,557 | 10/1976 | Valentine | 434/314 |
| 3,990,157 | 11/1976 | Valentine | 434/314 |
| 3,990,158 | 11/1976 | Valentine | 434/314 |
| 3,991,488 | 11/1976 | Valentine | 434/314 |
| 3,991,489 | 11/1976 | Valentine | 434/314 |
| 4,003,140 | 1/1977 | Valentine | 434/314 |
| 4,004,353 | 1/1977 | Valentine | 434/314 |
| 4,006,537 | 2/1977 | Valentine | 434/314 |
| 4,006,538 | 2/1977 | Valentine | 434/314 |
| 4,009,524 | 3/1977 | Valentine | 434/314 |
| 4,026,039 | 5/1977 | Valentine | 434/314 |
| 4,026,040 | 5/1977 | Valentine | 434/314 |
| 4,170,753 | 10/1979 | Michalski | 324/384 |
| 4,251,774 | 2/1981 | Knödler | 324/384 |
| 4,316,720 | 2/1982 | Ackerman | 434/366 X |
| 4,418,388 | 11/1983 | Allgor et al. | 364/431.01 |
| 4,425,097 | 1/1984 | Owens | 434/366 X |
| 4,531,190 | 7/1985 | Drews et al. | 364/431.11 |
| 4,587,615 | 5/1986 | Takahashi | 364/431.11 |
| 4,590,566 | 5/1986 | Takahashi | 364/431.11 |
| 4,627,275 | 12/1986 | Henein et al. | 73/112 |
| 4,943,238 | 7/1990 | Gregorio | 434/224 |

Primary Examiner—Stephen R. Crow
Assistant Examiner—D. F. Crosby
Attorney, Agent, or Firm—Salzman & Levy

[57] ABSTRACT

The invention features an engine operation simulation system for training maintenance and service personnel to diagnose and repair engines. The engine operating simulation system utilizes an actual electronic control unit for controlling an engine. A processor is provided to perform an simulation of engine operating parameters. The processor interfaces with the engine electronic control unit. A mechanism is provided for generating inputs and is connected to the processor and to the engine electronic control unit to provide parameters that represent engine operating characteristics. The parameters are applied to the engine electronic control unit. The input generating mechanism provides a plurality of simulated input signals that monitor the engine operation. There is also provided a mechanism for simulating a malfunction in the engine so that the processor can alter the desired operating parameters. Finally, a feedback mechanism is provided between the engine electronic control unit and the processor for updating engine and electronic control unit parameters.

14 Claims, 5 Drawing Sheets

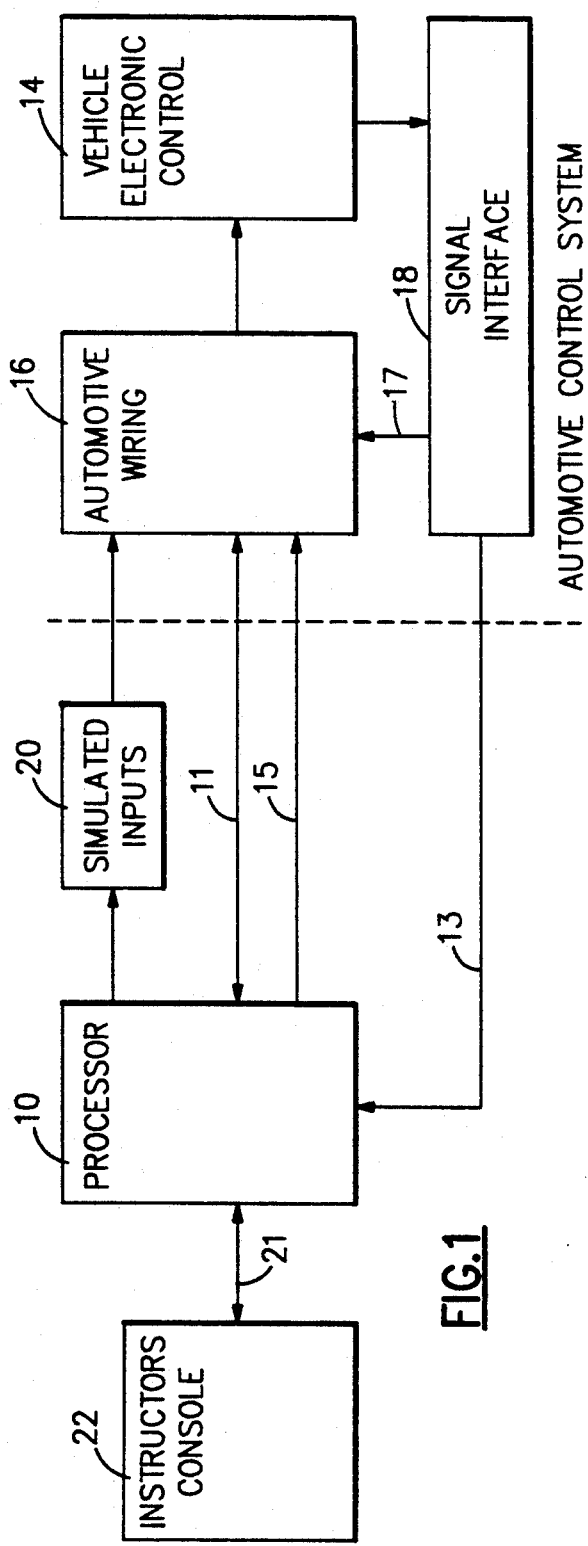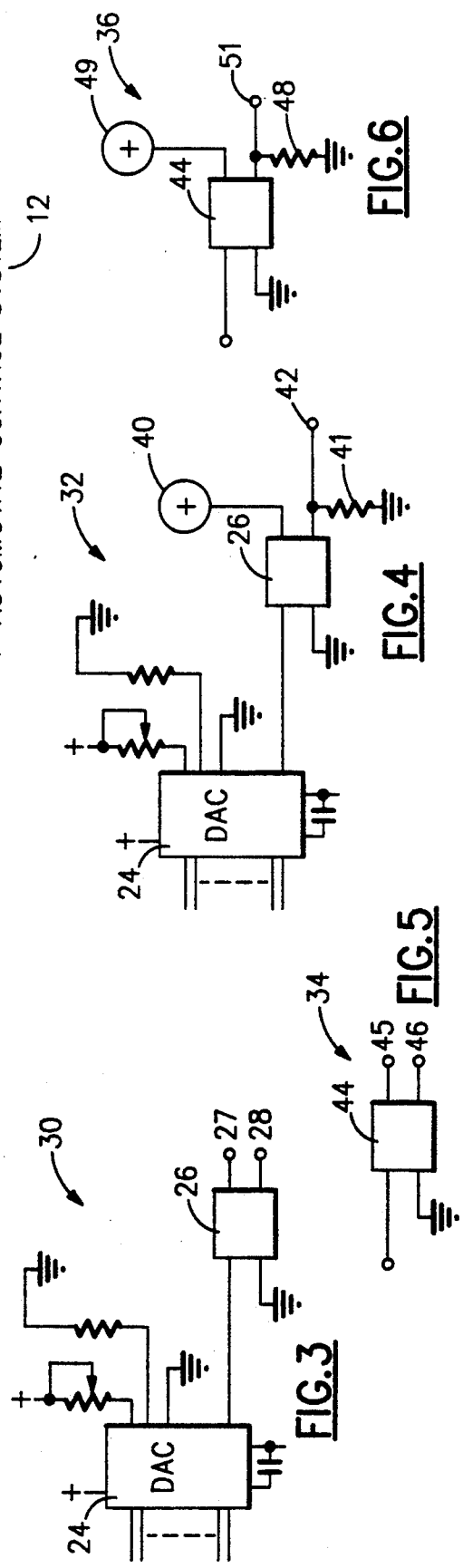

COMPUTERIZED SYSTEM FOR TRAINING ENGINE MAINTENANCE PERSONNEL

BACKGROUND OF THE INVENTION

The present invention relates to training simulators and, more particularly, to an automotive operating simulation system used to train personnel in the maintenance, diagnosis, and repair of computer-controlled engines, such as automobile engines.

Automotive service personnel are taught to diagnose, repair and maintain computer-controlled engines, such as automobile engines, mainly from an academic standpoint. Training of automotive personnel therefore, tends to be theoretical. When hands-on experience is provided, most often a class of students is instructed, under the direction of one teacher, to work on an automobile to discover predetermined malfunctions of the engine. This provides limited experience for the students, as a number of them must be trained on one vehicle and the number and diversity of malfunctions that can occur on any one vehicle are limited.

As with many areas of technology, simulation systems can provide flexibility and variety at a minimal cost. U.S. Pat. No. 4,406,627 issued to Winthrop et al discloses a waveform simulator. A maintenance training system capable of simulating functions of electronic equipment is disclosed. A programmable waveform generator is used, along with a microcomputer in a modular design. The system provides waveform generation and display in a real time maintenance trainer. Analog outputs of the programmable waveform generator drive the maintenance trainer's external meters, displays and oscilloscope. The waveform generator can be programmed to generate point by point circuit tracing of the original electronic equipment. Unfortunately, this system is rudimentary, requiring such devices as meters and an oscilloscope. For more sophisticated systems, such simplistic diagnostic tools are of limited use.

U.S. Pat. No. 4,004,353, issued to Valentine, discloses an educational kit for teaching trouble shooting procedures in an automotive electrical system. Audio visual instructional means are provided along with a simulator board upon which is graphically depicted a schematic diagram of a typical automobile electrical wiring system. Manipulative pieces are disposed on the simulator board to represent major parts of the electrical system. Unfortunately, once again, the board is simplistic in its presentation, displaying only rudimentary circuit lines and connections. Moreover, since the audio visual mechanism is preprogrammed, a significant degree of flexibility is lacking from the system.

U.S. Pat. No. 3,604,128 issued to Homann discloses a teaching machine having visual displays. An audio system is provided for simulating sound effects associated with the problems being solved by the student. A programmable meter enables simulation of measurements which would be taken by a student on actual equipment under various conditions. The system can be used to teach a student to detect and rectify problems associated with the starting of internal combustion engines. The system is unfortunately abstract in its representation of such problems and, since it is pre-programmed, flexibility and variety are restricted.

U.S. Pat. No. 4,425,097 issued to Owens, discloses a training aid for operators of equipment such as heavy mobile equipment. A connector cable is releasable connected to the control systems and indicators on the vehicle. The control unit is capable of simulating one or more abnormal conditions in the equipment by overriding normal readings. Unfortunately, the system still requires the use of an actual vehicle, functions of which can be overridden. The accessibility to such vehicles is, of course, limited and results in a number of students using the same vehicle at one time. Moreover, control wiring used solely for the control unit can be distracting to students whose goal is to learn about actual vehicle components and proper operation thereof.

It would be advantageous to provide a system for simulating the operation of an engine, its performance and its malfunctions.

It would also be advantageous to provide a system to allow an instructor to simulate malfunctions, and introduce them into a simulated operation of an engine at will.

It would also be advantageous to provide a training system that would not be dependent upon actual vehicles or engines, or the actual operation of same.

It would also be advantageous to provide a simulation system that utilizes the actual automotive control unit of any given vehicle as a means to provide operative simulation signals characteristic of a running engine.

It would be advantageous to provide a relatively sophisticated system for aiding a trainee and inducing malfunctions to students in a meaningful way.

It would also be advantageous to provide a system for training service personnel in a manner most closely related to an actual vehicle operating situation.

SUMMARY OF THE INVENTION

In accordance with the present invention, there is provided an engine operating simulation system for training maintenance and service personnel to diagnose and repair engines. The simulation system utilizes an actual electronic control unit for controlling the engine. A processor is provided to perform a simulation of engine operating parameters. The processor interfaces with the engine or vehicle electronic control unit. A mechanism is provided for generating inputs. The input generating mechanism is connected to the processor and to the engine electronic control unit to provide parameters that represent engine operating characteristics. The parameters are applied to the engine electronic control unit. The input generating mechanism provides a plurality of simulated input signals. There is also provided a mechanism for simulating one or more malfunctions in the engine so that the processor can alter the desired operating parameters. Finally, a feedback mechanism is utilized between the engine electronic control unit and the processor for updating engine and electronic control unit parameters.

BRIEF DESCRIPTION OF THE DRAWINGS

A complete understanding of the present invention may be obtained by reference to the accompanying drawings, when taken in conjunction with the detailed description thereof and in which:

FIG. 1 is a block diagram of the system for training maintenance personnel in accordance with the present invention;

FIG. 3 is a simulated variable resistor circuit;

FIG. 4 is an analog voltage source;
FIG. 5 is a simulated switch;
FIG. 6 is a simulated pulse train.

DESCRIPTION OF THE PREFERRED EMBODIMENT

Figure 2:
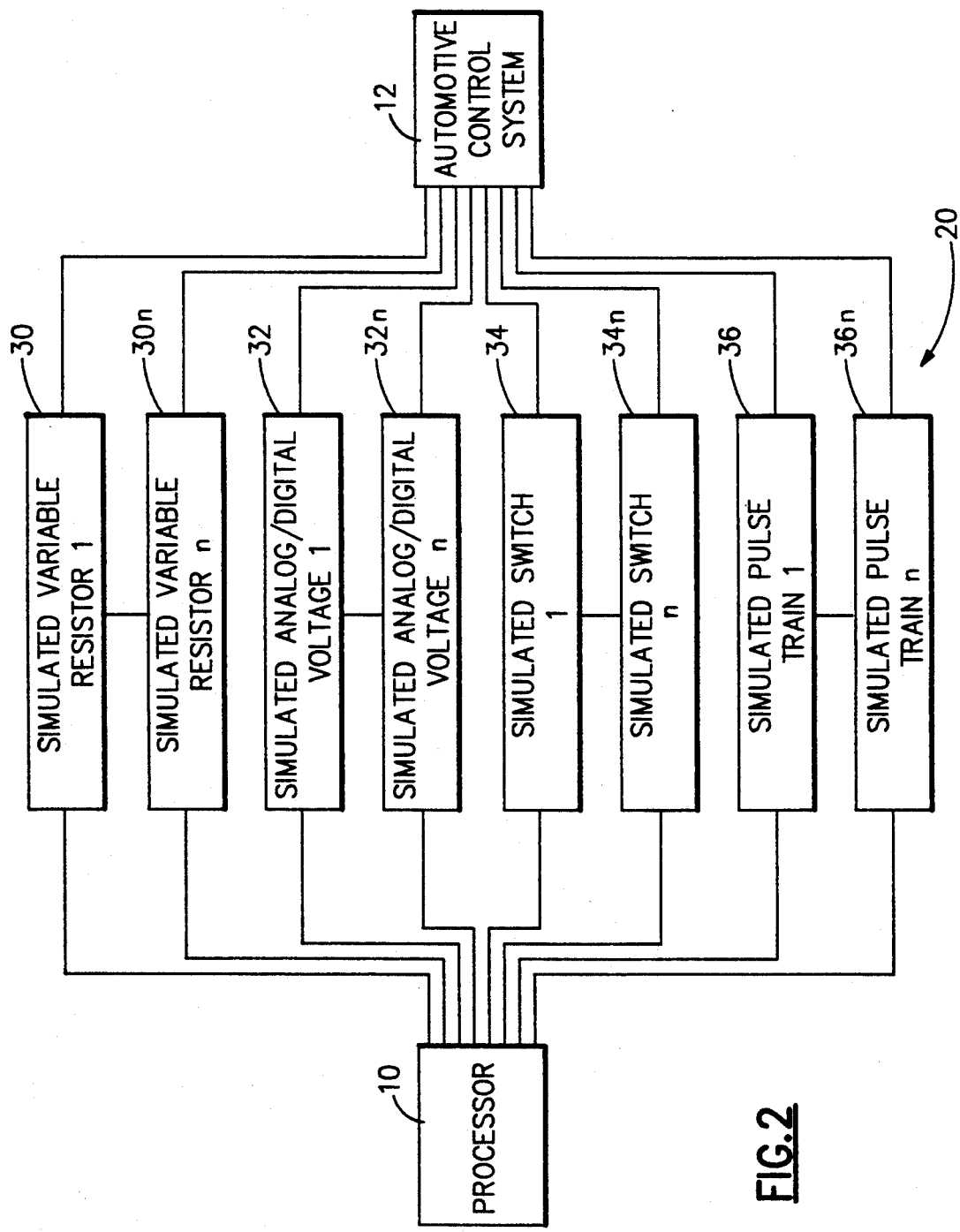
FIG. 2 is a block diagram of simulated inputs of the system of FIG. 1 shown in greater detail.

Referring now to FIG. 1, there is shown a block diagram of the computerized system for training engine maintenance personnel. An 8-bit digital microprocessor 10 complete with data bus interface, such as is manufactured by the Motorola Company as model no. MC68HC11A8, is provided to control the system and calculate required parameters, as hereinbelow described in greater detail. It should be understood that any processor may be used to control operations, without departing from the scope of this invention.

Connected to processor 10 is an automotive control system, shown generally as reference numeral 12, which is a standard computer system found in most modern sophisticated vehicles. It should be noted, however, that the term automotive control system 12 may be used herein to define and identify a computer system used with vehicles other than automobiles, such as aircraft, boats, tanks, trucks, etc., or may be a replica of such actual control system or a simulation thereof. Processor 10 is connected to automotive control system 12 by means of a bidirectional line 11 and by means of other lines, as described hereinbelow. Power and ground signals are provided to automotive control system 12 by processor 10 via line 11. Line 11 is also the path for certain signals from automotive control system 12 to processor 10. In the preferred embodiment, signals that represent, for example, Throttle position sensor voltage, air conditioning ON, switched ignition, crank input and gear selector switch information are provided to processor 10 over line 11.

Audio signals representative of the simulated engine sound(s) are provided to automotive control system 12 by processor 10 via line 15.

Automotive control system 12 actually comprises a number of components, including a vehicle electronic control 14, which is the heart of the automotive control system 12, and is sometimes referred to by various manufacturers as an electronic control module (ECM), electronic control unit (ECU) or the like. Connected to vehicle electronic control 14 is automotive wiring 16, as provided in vehicles. Also connected to vehicle electronic control 14 is a signal interface 18 which is capable of directing certain of the signals to multiple destinations via lines 13 and 17.

Also connected to processor 10 is a simulated input device 20, described in greater detail with reference to FIG. 2, below. Simulated inputs 20 are connected not only to processor 10 but also to automotive control system 12 and allow the main sensor and operating parameters of processor 10 to be used by automotive control system 12. Connected to processor 10 via bidirectional line 21 is an instructor's console 22, which allows an instructor to induce a malfunction to the system in a simulated manner.

Referring now also to FIG. 2, there is shown a block diagram with the simulated input device 20 shown in greater detail. A plurality of simulated devices is shown for descriptive purposes only and may be added to, subtracted from or modified in accordance with the particular operating requirements of the system for which the invention is intended. In particular, a simulated variable resistor is shown at reference numeral 30. Any number of simulated variable resistors, 1, 2, 3, ... , n, can be provided in the system, indicated in FIG. 2 as reference numerals 30, ..., n.

A plurality of simulated analog/digital voltage devices, 1, 2, 3, ..., 32n is provided to simulate analog/digital voltage levels. Similarly, any number of simulated analog/digital voltage devices 32, ..., 32n may be provided in the system, as needed.

Simulated switches 34, ..., 34n are provided to simulate positions of various switches within an automotive system. While the preferred embodiment of the invention contemplates the use of binary switches, multi-position switches can also be used, when required.

Finally, a plurality of simulated pulse train devices 36, ..., 36n is provided to simulate pulse trains.

Referring now also to FIG. 3, a simulated variable resistor 30 is shown. An optoisolator 26 and digital to analog converter (DAC) 24 make up the simulated variable resistor 30. DAC 24 converts the incoming data to an analog signal, applied to the input of optoisolator 26. The output 27, 28 of optoisolator 26 produces a resistance which varies, thereby producing a variable resistor.

The aforementioned simulated variable resistor 30 in FIG. 3 becomes an analog/digital voltage source 32 with the addition of voltage source 40 and resistor 41 as shown in FIG. 4. The variable resistor 30 varies the total resistance of a series circuit, producing an analog/digital voltage at output 42.

Referring now also to FIG. 5, a simulated switch 34 is shown, which uses digital output 37 controlled by processor 10. Processor 10 provides the ON/OFF control at digital output 37 and produces an ON/OFF switch action at the output 45, 46 of optoisolator 44.

Referring now also to FIG. 6, a pulse train simulator 36 adds a voltage source 49 and resistor 48, as shown, to the simulated switch circuit 34 of FIG. 5, described above. The aforementioned switch action of optoisolator 44 allows the current to flow through this series circuit whenever optoisolator 44 is in the ON state. The pulse train follows the input signal 37 directly with the output at 51.

The simulated components (variable resistors 30, analog/digital voltage sources 32, switches 34 and pulse train generators 36) of this invention are designed to permit an operator to simulate the control inputs to the automotive control system 12. These inputs, when used in place of their respective sensors, switches and the like, allow the operator to simulate any condition that the automotive control system 12 may incur. These conditions can range from normal operation to faulted operation such as a wiring failure, a sensor failure, an intermittent failure, or any possible combination of components problems.

Figure 7A:
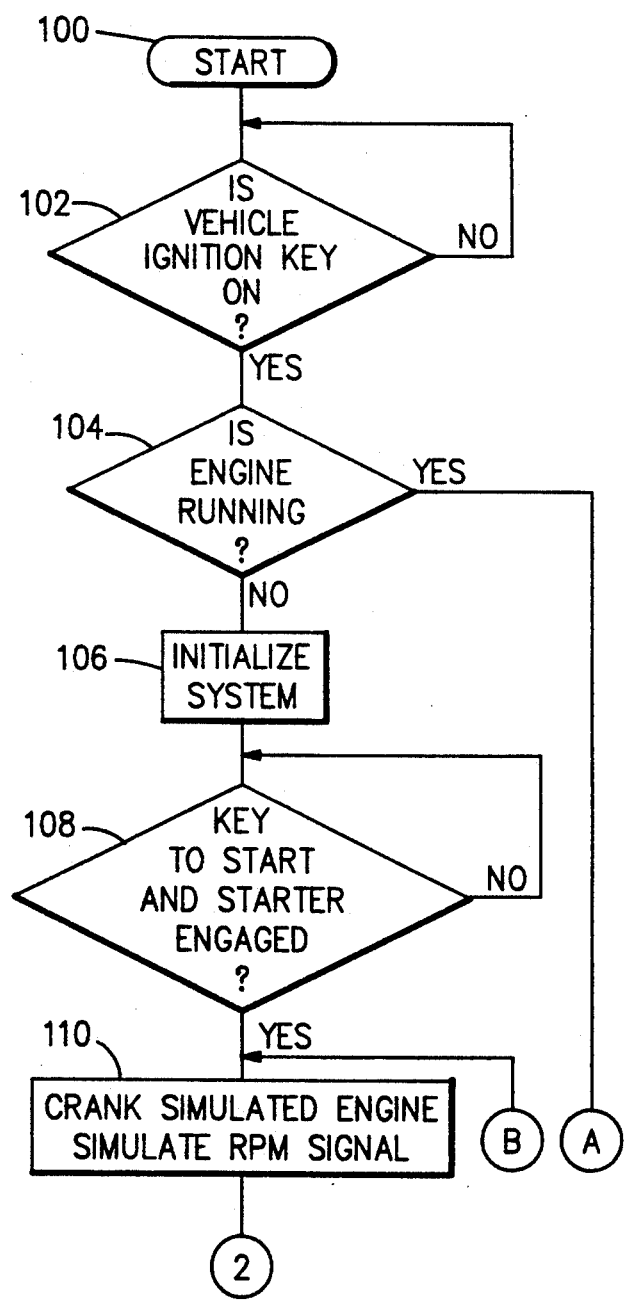
FIGS. 7a-7c depict a flow chart of processor operations in accordance with the present invention.
Figure 7B:
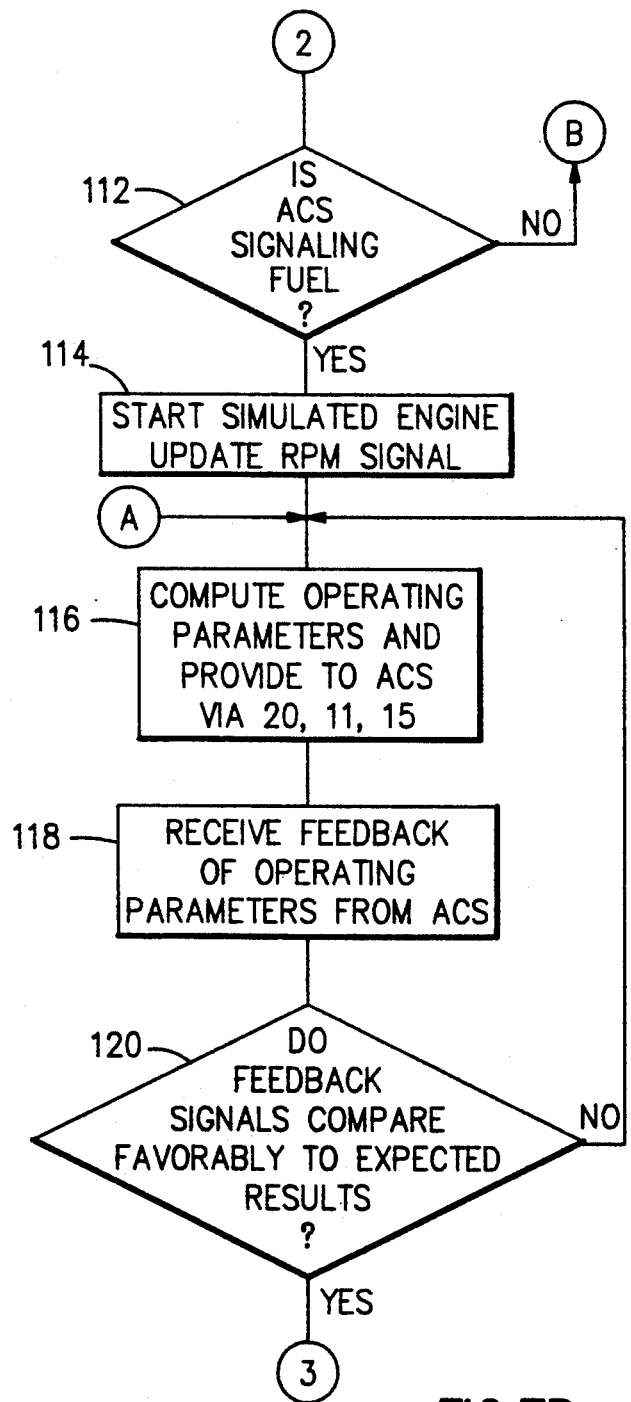
Figure 7C:
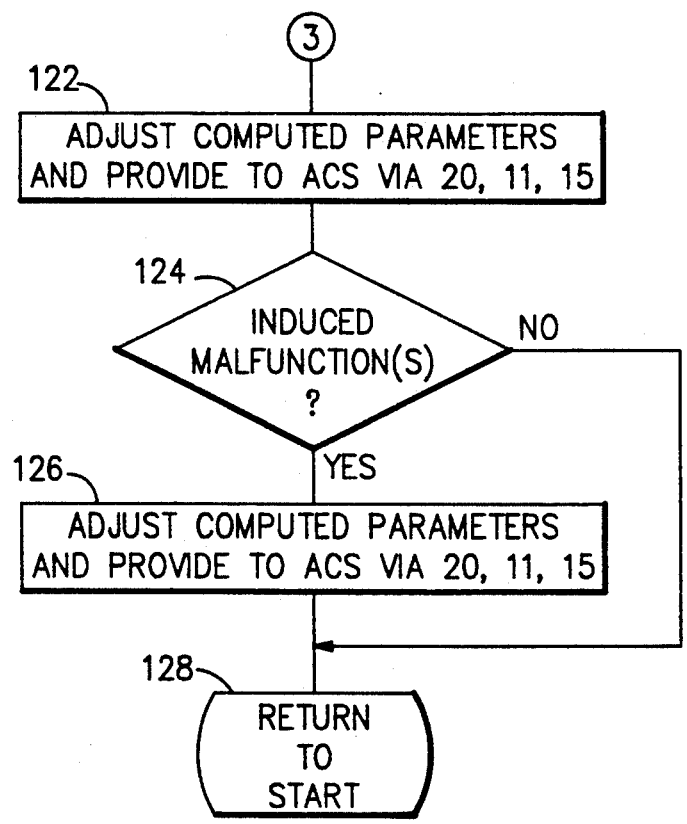

Referring now also to FIGS. 7a-7c, there is shown a flow chart of operations of processor 10 (FIG. 1) of the present invention. The system is started, step 100, and a determination is made as to whether the vehicle ignition key is inserted and switched on, step 102. If not, the system waits for such a condition to occur.

If the vehicle ignition switch is switched ON, step 102, and the engine is not running, step 104, the system is initialized, step 106.

If the engine is currently running, step 104, then the system computes operating parameters, step 116, and provides them to the automotive control system (ACS) 12 (FIG. 1).

If the vehicle ignition key is turned to start and the starter is engaged, step 108, the simulated engine is cranked and a simulated RPM signal is then generated by processor 10, step 110. If not, the system waits for such a condition to occur.

The system then determines if the ACS 12 is signaling fuel (i.e., whether the fuel pump is operational and fuel is being delivered), step 112. If such is not the case, the engine continues to be cranked, step 110. If fuel is being delivered, step 112, however, the simulated engine is started (i.e., engine is running) and the RPM signal is again updated and applied to automotive control system 12, step 114.

The system then computes operating parameters such as exhaust oxygen level, manifold absolute pressure, power steering pressure, mass airflow, manifold air temperature, exhaust gas recirculation (EGR) vacuum level, engine knock, barometric pressure, differential vacuum pressure, brake pressure, A/C refrigerant pressure, and the like, step 116. Once the aforementioned parameters are computed, the processor 10 provides these parameters in signal form by means of one or more simulated input devices 20 to automotive control system 12.

Once the operating parameters have been omputed and provided to the automotive control system 12, step 116, processor 10 is available to receive feedback information from automotive control system 12 by means of line 13 (FIG. 1), step 118. Feedback information that is provided to processor 10 includes but is not limited to injector voltage, fuel pump relay drive, transmission and clutch converter, A/C clutch relay, cooling fan, electronic spark timing by-pass, electronic spark timing signal, and idle air control. As a result of receiving the aforementioned feedback signals from signal interface 18, processor 10 compares the feedback results to expected results and determines whether the comparison is favorable, step 120. If not, parameters are re-omputed and provided to the automotive control system 12. If, however, the feedback signals do compare favorably to the expected results, step 120, the computed parameters are adjusted by processor 10 and provided to automotive control system 12, step 122.

At any time, the instructor may use his or her instructor's console 22 (FIG. 1) and may also alter the physical components, not shown, when appropriate, to induce a malfunction to the system. Operator's console 22 may include a visual display such as a CRT or LCD display. In the preferred embodiment, the operator's options are represented by a menu system on a display device, such as a CRT monitor, not shown. Once the operator reaches the menu of malfunctions, he or she may choose one of the malfunctions shown in Table I in the preferred embodiment to be induced in the system.

TABLE I

| Number | MALFUNCTIONS Malfunction |
|---|---|
| 1 | No diagnostic capability |
| 2 | Oxygen sensor circuit |
| 3 | Coolant sensor voltage (low) |
| 4 | Coolant sensor voltage (high) |
| 5 | TPS voltage (high) |
| 6 | TPS voltage (low) |
| 7 | Vehicle speed sensor |
| 8 | Map sensor voltage (high) |
| 9 | Map sensor voltage (low) |

TABLE I-continued

| Number | MALFUNCTIONS Malfunction |
|---|---|
| 10 | Idle air control (IAC) |
| 11 | EST |
| 12 | Lean exhaust |
| 13 | Rich exhaust |
| 14 | PROM |
| 15 | ECM |
| 16 | Open ground |
| 17 | Bad ground |
| 18 | Short to ground |
| 19 | Open circuit |
| 20 | Short circuit |
| 21 | Vacuum hose loose (manifold) |
| 22 | Spark plug wires (open in wire) |
| 23 | Spark plug wires (very high resistance) |
| 24 | Erratic sensor |
| 25 | Intermittent problems |
| 26 | Battery voltage low |
| 27 | Cranks but won't start |
| 28 | Oxygen sensor sluggish |
| 29 | Rough, unstable, or incorrect idle; stalling |

The operator may choose one or more of the above-identified malfunctions, selecting them by using a keyboard ENTER or INSERT key, resulting in an asterisk next to the selected malfunction(s). Up to six malfunctions can be selected simultaneously in the preferred embodiment.

If an induced malfunction is detected, step 124, processor 10 then alters or disables the appropriate system (e.g., ignition system, AC system, starter system, etc.) and adjusts the computed parameters, providing the adjusted values to automotive control system 12, step 126. Sound also may be appropriately modified by processor 10, if desired. If, however, the induced malfunction is not detected, step 124, the program advances to step 128. At this point, the program returns, step 128, to the beginning thereof, step 100.

It should be understood that while the induced malfunction decision block is shown at step 124 in FIG. 7b, induced malfunction may occur at any time and will interrupt the process. The induced malfunctions are then handled by processor 10 and, presumably, by the trainee who will learn to identify and correct such malfunctions by correcting or adjusting the physical components, if necessary.

The diagnostic subsystem and capability of the standard automotive control system 12 is used in conjunction with this invention to identify and process malfunctions as they occur. In this way, the trainee becomes accustomed to using the diagnostic subsystem in the manner for which it was designed, oblivious to the fact that the simulated invention provokes or induces such errors.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. An automobile engine operating simulation system for training maintenance and service personnel to diagnose and repair engines, said engine operating simulation system having an electronic control unit for providing operation signals normally obtained in actual engine operation for the control of fuel delivery, emissions and diagnostics of a running engine, the automobile engine operating simulation system comprising:
a) an automobile engine electronic control unit;
b) processing means for performing a simulation of an automobile engine operating parameters, said processing means interfacing with said automobile engine electronic control unit for providing operating signals of an actual engine; and
c) input means for generating input signals, said input means being operatively connected to said processing means and to said automobile engine electronic control unit providing engine parameters representative of engine operating characteristics to said automobile engine electronic control unit.

2. The automobile engine operating simulation system for training maintenance and service personnel in accordance with claim 1, wherein said generated inputs of said input means comprise input signals corresponding to signals generated by a plurality of engine sensors.

3. The automobile engine operating simulation system for training maintenance and service personnel in accordance with claim 1, wherein said processing means applies a signal directly to said automobile electronic control unit simulative of a predetermined voltage level.

4. The automobile engine operating simulation system for training maintenance and service personnel in accordance with claim 1, further comprising:
d) feedback means operatively connected between said automobile electronic control unit and said processing means for providing updated automobile engine and automobile electronic control unit parameters into the automobile engine operating simulation system.

5. The automobile engine operating simulation system for training maintenance and service personnel in accordance with claim 3, further comprising:
d) feedback means operatively connected between said automobile electronic control unit and said processing means for providing updated automobile engine and automobile electronic control unit parameters into the automobile engine operating simulation system.

6. An automobile engine operating simulation system for training maintenance and service personnel to diagnose and repair engines, said automotive engine operating simulation system having an electronic control unit for providing operation signals normally obtained in actual automotive engine operation for the control of fuel delivery, emissions and diagnostics of a running engine, comprising:
a) an engine electronic control unit;
b) processing means for performing a simulation of engine operating parameters, said processing means interfacing with said engine electronic control unit;
c) input means operatively connected to said processing means and to said engine electronic control unit for providing signals representing parameters of engine operating characteristics to said engine electronic control unit;
d) simulation means including resistive, voltage, switch and pulse signal input means, operatively connected to said processing means for introducing signals to said processing means simulative of a malfunction in the engine or operation thereof; and
e) feedback means operatively connected between said electronic control unit and said processing means for providing signals representing updated engine operation and electronic control unit parameters.

7. The automobile engine operating simulation system for training maintenance and service personnel in accordance with claim 6, wherein said generated inputs of said input means comprise input signals corresponding to signals generated by a plurality of engine sensors.

8. A method of simulating the operation of an engine for the purpose of training maintenance and service personnel to diagnose and repair said engine, comprising the steps of:
a) electronically simulating the operation of an engine;
b) determining whether the engine is simulatively running;
c) determining a plurality of engine operation parameters for said simulatively running engine;
d) generating simulative signals representing the parameters in step (c), and providing these simulative signals to a control system;
e) simulating sensor information for an operating engine indicative of operative engine outputs; and
f) comparing said sensor information with expected engine outputs.

9. The method of simulating the operation of an engine for the purpose of training maintenance and service personnel to diagnose and repair said engine in accordance with claim 8, wherein said sensor information comprises at least one of the simulated engine output signals such as: injector voltage, fuel pump relay drive, transmission and clutch converter, A/C clutch relay, cooling fan, electronic spark timing by-pass, electronic spark timing signal, and idle air control.

10. The method of simulating the operation of an engine for the purpose of training maintenance and service personnel to diagnose and repair said engine in accordance with claim 8, wherein said comparison step (f) includes the further step of:
g) adjusting simulated engine operation parameters if said comparison does not favorably compare.

11. The method of simulating the operation of an engine for the purpose of training maintenance and service personnel to diagnose and repair said engine in accordance with claim 8, further comprising the step of:
g) introducing simulated malfunction signals into said control system.

12. The method of simulating the operation of an engine for the purpose of training maintenance and service personnel to diagnose and repair said engine in accordance with claim 8, further comprising the step of:
g) displaying simulated engine operations.

13. The method of simulating the operation of an engine for the purpose of training maintenance and service personnel to diagnose and repair said engine in accordance with claim 11, wherein said introducing simulated malfunctions signals in accordance with step (g) includes the further step of selecting at least one of a plurality of malfunction problems from a menu.

14. The method of simulating the operation of an engine for the purpose of training maintenance and service personnel to diagnose and repair said engine in accordance with claim 8, wherein said engine is an automotive engine.

* * * * *